United States Patent
Lad et al.

(10) Patent No.: US 11,466,604 B2
(45) Date of Patent: Oct. 11, 2022

(54) DIESEL EXHAUST FLUID DOSER PROTECTION DURING COLD AMBIENT TEMPERATURE CONDITIONS USING CYLINDER CUTOUT METHODS

(71) Applicant: Cummins Inc., Columbus, IN (US)

(72) Inventors: Ankit Raghunath Lad, Columbus, IN (US); Joshua Alan Lantz, North Vernon, IN (US); Vaibhav J. Lawand, Greenwood, IN (US); Nicholas R. Lewis, Elizabethtown, IN (US); Ian W. McGiffen, Scipio, IN (US); Arulkumaran Muthukumarasamy, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/471,826

(22) Filed: Sep. 10, 2021

(65) Prior Publication Data

US 2021/0404366 A1    Dec. 30, 2021

Related U.S. Application Data

(63) Continuation of application No. PCT/US2020/022612, filed on Mar. 13, 2020.

(Continued)

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01D 53/9495* (2013.01);
(Continued)

(58) Field of Classification Search
CPC combination set(s) only.
See application file for complete search history.

(56) References Cited

U.S. PATENT DOCUMENTS

| 6,363,771 B1 | 4/2002 | Liang et al. |
| 7,805,930 B2 | 10/2010 | Satou et al. |

(Continued)

FOREIGN PATENT DOCUMENTS

| EP | 2 685 072 | 1/2014 | |
| EP | 2685072 | * 1/2014 | ............. F02D 41/02 |
| EP | 3 165 744 | 5/2017 | |

OTHER PUBLICATIONS

International Search Report and Written Opinion for International Application No. PCT/US2020/022612, dated Jun. 18, 2020, 13 pages.

*Primary Examiner* — Binh Q Tran
(74) *Attorney, Agent, or Firm* — Foley & Lardner LLP

(57) ABSTRACT

A system includes an exhaust aftertreatment system in exhaust gas receiving communication with an engine including a plurality of cylinders where the engine is structured to operate according to low load conditions and where a controller is structured to determine that at least one diesel emissions fluid (DEF) doser is frozen based on at least one of an ambient air temperature and a DEF source temperature. The controller is structured to operate the engine according to a skip-fire mode in response to a DEF flag indicating that the at least one DEF doser is frozen. The skip-fire mode comprises firing a portion of the plurality of cylinders that is less than a total amount of cylinders of the plurality of cylinders. The controller is structured to discontinue the skip-fire mode in response to determining that the at least one DEF doser is likely thawed.

20 Claims, 5 Drawing Sheets

Related U.S. Application Data

(60) Provisional application No. 62/818,524, filed on Mar. 14, 2019.

(51) Int. Cl.
*F02D 41/00* (2006.01)
*F02D 41/02* (2006.01)
*F02D 41/04* (2006.01)

(52) U.S. Cl.
CPC ..... *F02D 41/0082* (2013.01); *F02D 41/0235* (2013.01); *F02D 41/042* (2013.01); *F01N 2900/12* (2013.01); *F01N 2900/16* (2013.01); *F01N 2900/1811* (2013.01); *F02D 2041/0265* (2013.01); *F02D 2200/08* (2013.01)

(56) References Cited

U.S. PATENT DOCUMENTS

| | | |
|---|---|---|
| 2010/0319321 A1 | 12/2010 | Kamiya et al. |
| 2012/0006003 A1 | 1/2012 | Darr et al. |
| 2015/0361857 A1* | 12/2015 | Matsuo .............. F01N 3/208 60/303 |
| 2016/0032801 A1* | 2/2016 | Alig .................. F01N 13/011 60/274 |
| 2016/0040577 A1* | 2/2016 | Nihongi ............ G01N 33/18 73/49.5 |
| 2016/0194992 A1 | 7/2016 | Shuto et al. |
| 2017/0074185 A1 | 3/2017 | Reynolds et al. |
| 2017/0152781 A1 | 6/2017 | Free et al. |
| 2017/0321582 A1* | 11/2017 | Nakao ................ F01N 3/208 |
| 2017/0328253 A1* | 11/2017 | Kizawa ............ F02D 41/0275 |
| 2018/0128142 A1* | 5/2018 | Collins .............. F01N 9/00 |

\* cited by examiner

DIESEL EXHAUST FLUID DOSER PROTECTION DURING COLD AMBIENT TEMPERATURE CONDITIONS USING CYLINDER CUTOUT METHODS

CROSS-REFERENCE TO RELATED APPLICATION

This application is a continuation of International Application No. PCT/US2020/022612, filed on Mar. 13, 2020, which claims priority to U.S. Provisional Patent Application No. 62/818,524, filed on Mar. 14, 2019, both of which are incorporated herein by reference in their entirety.

TECHNICAL FIELD

The present disclosure relates to operating an exhaust aftertreatment system in fluid communication with an engine under cold ambient temperature conditions. More particularly, the present disclosure relates to systems and methods for controlling the engine to produce exhaust gas to prevent overheating of components of the exhaust aftertreatment system when operating under cold ambient temperature conditions.

BACKGROUND

Vehicles can operate under a variety of environmental conditions having a wide range of ambient temperatures. Under cold ambient temperature conditions, some engine subsystems may be frozen, especially after an engine of the vehicle has been turned off. For example, under some components, diesel exhaust fluid (DEF) dosers of an exhaust aftertreatment system in fluid communication with the engine can freeze. When the DEF dosers are frozen, there is no DEF circulation in the exhaust gas stream.

SUMMARY

One embodiment relates to a method. The method includes determining that at least one diesel emissions fluid (DEF) doser of an exhaust aftertreatment system is frozen based on at least one of an ambient air temperature and a DEF source temperature. The exhaust aftertreatment system is in exhaust gas receiving communication with an engine operating according to a low load condition and that includes a plurality of cylinders. The method includes operating the engine in a skip-fire mode in response to the determination that the at least one DEF doser is frozen. The skip-fire mode includes firing a portion of the plurality of cylinders. The portion of the plurality of cylinders is less than a total amount of cylinders of the plurality of cylinders. The method includes discontinuing the skip-fire mode in response to determining that the at least one DEF doser is likely thawed.

Another embodiment relates to an apparatus. The apparatus includes a freeze determination circuit and a DEF doser protection circuit. The freeze determination circuit is structured to determine that at least one diesel emissions fluid doser of an exhaust aftertreatment system is frozen based on at least one of an ambient air temperature and a DEF source temperature. The exhaust aftertreatment system is in exhaust gas receiving communication with an engine including a plurality of cylinders and structured to operate according to a low load condition. The DEF doser protection circuit is structured to operate the engine in a skip-fire mode in response to the determination that the at least one DEF doser is frozen. The skip-fire mode includes firing a portion of the plurality of cylinders. The portion of the plurality of cylinders is less than a total amount of cylinders of the plurality of cylinders. The DEF doser protection circuit is structured to determine that the at least one DEF doser is likely thawed and discontinue the skip-fire mode in response to determining that the at least one DEF doser is likely thawed.

Another embodiment relates to a system. The system includes an exhaust aftertreatment system and a controller. The exhaust aftertreatment system is in exhaust gas receiving communication with an engine including a plurality of cylinders. The engine is structured to operate according to low load conditions. The controller is structured to determine that at least one DEF doser is frozen based on at least one of an ambient air temperature and a DEF source temperature. The controller is structured to operate the engine according to a skip-fire mode in response to the controller determining the at least one DEF doser is frozen. The skip-fire mode includes firing a portion of the plurality of cylinders. The portion of the plurality of cylinders is less than a total amount of cylinders of the plurality of cylinders. The controller is structured to discontinue the skip-fire mode in response to determining that the at least one DEF doser is likely thawed.

These and other features, together with the organization and manner of operation thereof, will become apparent from the following detailed description when taken in conjunction with the accompanying drawings.

DETAILED DESCRIPTION

Figure 1:
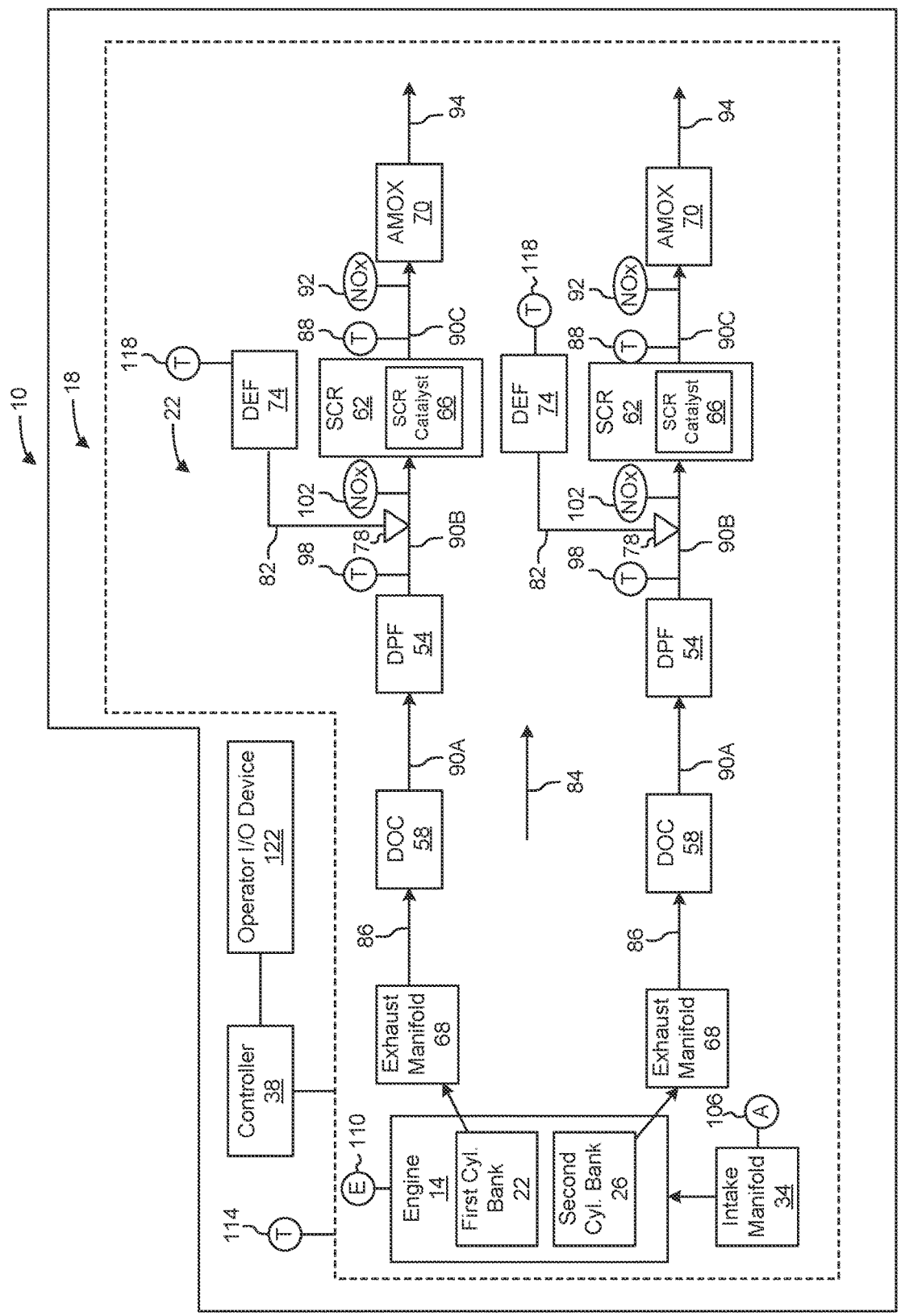
FIG. 1 is a schematic diagram of an engine and an exhaust aftertreatment system with a controller, according to an example embodiment.

Following below are more detailed descriptions of various concepts related to, and implementations of methods, apparatuses, and systems for dynamically controlling an engine according to a DEF doser protection mode to generate exhaust gas at a temperature that is high enough to thaw frozen diesel exhaust fluid (DEF) dosers and low enough to prevent the frozen DEF dosers from overheating. The various concepts introduced herein may be implemented in any number of ways, as the concepts described are not limited to any particular manner of implementation. Examples of specific implementations and applications are provided primarily for illustrative purposes.

Engines can include at least a first cylinder bank including a plurality of first cylinders and a second cylinder bank including a plurality of second cylinders. The engine can fire the first cylinder bank, the second cylinder bank, or both the first cylinder bank and the second cylinder bank based on the demanded output of the engine. Each of the cylinder banks is in exhaust gas-receiving communication with an exhaust aftertreatment system structured to reduce nitrous oxides (NOx) in the exhaust gas stream into less harmful compounds before the exhaust gas exits the vehicle. The exhaust gas stream can include a plurality of DEF dosers and a selective catalytic reduction (SCR) catalyst.

The engine may operate in low load conditions shortly after the engine has started up. In some climates, the vehicle may be parked in outdoor environmental conditions in which an ambient air temperature is below a freezing point of some of the vehicle components. For example, the vehicle may be parked outside when the ambient temperature is below the freezing point of DEF. Under such conditions, the DEF dosers, the DEF source, and/or piping connecting the DEF source to the DEF dosers can freeze. During normal operation of the exhaust aftertreatment system, the flow of DEF through the DEF dosers and the airflow of DEF around the DEF dosers can cool the DEF dosers through heat transfer (e.g. heat from a DEF doser is transferred to the DEF as the DEF passes through the DEF doser and/or DEF in the exhaust gas stream travels around the DEF doser). However, when the DEF dosers are frozen, DEF is not injected into the exhaust gas stream and DEF is not present in the exhaust gas stream to transfer heat away from the DEF dosers, which can cause the DEF injectors to overheat. Accordingly, it is advantageous to identify frozen DEF dosers upon start-up of engines operating in cold environmental conditions and, in response to identifying frozen DEF dosers, control the engine to produce exhaust gas at temperatures that are warm enough to thaw the DEF dosers and cool enough to prevent overheating of the frozen DEF dosers.

For example, the vehicle can include a controller structured to monitor the fueling demands for the engine to meet the engine load requested from the operator and determine, based on the fueling demand, whether various combinations of the cylinder banks and/or the cylinders should be activated or deactivated. The engine can fire both cylinder banks when a high engine load is requested. Under low load engine operating conditions, the engine can operate according to a skip-firing operating mode and a single bank cut out (SBCO) operating mode. The skip-firing operating mode fires cylinders in both cylinder banks and generates exhaust that is cool enough to thaw the DEF dosers while preventing overheating of the DEF dosers. During the SBCO operating mode, only one of the cylinder banks is fired. The exhaust generated when operating the engine according to the SBCO operating mode is hot enough to regenerate the SCR catalyst, but could lead to overheating of frozen DEF dosers.

The exhaust aftertreatment system further includes filters and catalysts that are structured to remove dirt and soot from the exhaust and reduce the NOx to less harmful emissions, such as Na and $H_2O$ before the exhaust exits the vehicle. For example, the exhaust aftertreatment system includes, among other things, a selective catalytic reduction (SCR) catalyst. During engine operation, unburned hydrocarbons, dirt, soot, etc. can accumulate on the SCR catalyst, and the SCR catalyst must be regenerated to protect the SCR catalyst. The SCR catalyst is regenerated by producing very high temperature exhaust with the engine so that the unburned hydrocarbons, dirt, soot, etc. burn off of the SCR catalyst.

The controller is structured to determine whether to operate the engine to protect frozen DEF dosers and or to protect the SCR catalyst during low load engine operating conditions at low ambient temperatures. The controller is structured to prioritize, in order of highest priority to lowest priority, SCR desorption (e.g., SCR catalyst regeneration) in response to determining very high levels of bound hydrocarbons are present, protecting DEF dosers that are likely frozen, SCR desorption in response to determining high levels of bound hydrocarbon are present (e.g., SCR catalyst regeneration), and normal SBCO operation (e.g. without any SCR catalyst regeneration). For example, in response to determining that the SCR catalyst has high or very high levels of bound hydrocarbons and that at least some DEF dosers are likely to be frozen, the controller is structured to operate the engine according to the SBCO mode to regenerate the SCR catalyst. In response to determining that the amount of bound hydrocarbons is medium or low and at least one DEF dosers are likely frozen, the controller is structured to operate the engine according to the skip-firing mode to protect the DEF dosers that are likely to be frozen.

Referring to the Figures generally, the various embodiments disclosed herein relate to systems, apparatuses, and methods for controlling engine firing modes of an engine operating with a low operating load under low temperature operating conditions to prevent overheating of DEF dosers of an exhaust aftertreatment system. The systems, apparatuses, and methods are structured to control the engine to produce exhaust gas that is warm enough to thaw the frozen DEF doser(s) and is cold enough not to overheat the frozen DEF doser(s). The systems, apparatuses, and methods can also be structured to determine whether to control the engine firing conditions to produce exhaust gas at a relatively low temperature to thaw frozen DEF doser(s) or to control the engine firing conditions to produce exhaust gas at a relatively high temperature that increases SCR catalyst efficiency and/or to produce exhaust gas at a temperature high enough to undergo SCR catalyst regeneration.

As shown in FIG. 1, an engine coupled to two exhaust aftertreatment systems and a controller is depicted, according to an example embodiment. A vehicle includes an engine system 10 that includes an internal combustion engine 14 and an exhaust aftertreatment system 18 in exhaust gas-receiving communication with the engine 14. According to one embodiment and as shown, the engine 14 is structured as a compression-ignition internal combustion engine that utilizes diesel fuel. However, in various alternate embodiments, the engine 14 may be structured as any other type of engine (e.g., spark-ignition) that utilizes any type of fuel (e.g., gasoline). Within the internal combustion engine 14, air from the atmosphere is combined with fuel, and combusted, to power the engine. Combustion of the fuel and air in the compression chambers of the engine 14 produces exhaust gas that is operatively vented to an exhaust manifold 68 and to the exhaust aftertreatment system 18. In some embodiments, the engine 14 can be any size engine that has cylinders oriented in a V-configuration with split exhaust aftertreatment systems. In some embodiments, the engine 14 can be a large bore engine having an engine displacement of at least approximately 30 L. In some embodiments, the engine 14 can have an engine displacement ranging between approximately 30 L and approximately 120 L. As used herein, "engine displacement" generally refers to a volume of gas displaced by the all of the cylinders in the engine 14. In some embodiments, the cylinders can be oriented in a V-configuration. In such embodiments, the engine 14 can range from a V8 engine to a V20 engine.

The engine 14 includes at least a first cylinder bank 22 and a second cylinder bank 26. A plurality of combustion cylinders is arranged into the first cylinder bank 22 and the second cylinder bank 26. The engine 14 can be controlled by a controller 38 to fire various combinations of the cylinder banks 22, 26 and/or the cylinders to meet the engine load requested from the operator. The controller 38 can monitor the fueling demands for the engine 14 to meet the engine load requested from the operator and determine, based on the fueling demand, whether various combinations of the cylinder banks 22, 26, and/or the cylinders should be activated or deactivated. The engine 14 can fire both cylinder banks 22, 26 when a high engine load is requested (e.g., under high load engine operating conditions). The engine 14 can fire a portion of the cylinders within the cylinder banks 22, 26 when a low engine load is requested (e.g., under low load engine operating conditions). In some embodiments, under low load engine operating conditions, the engine 14 can operate according to a skip-firing operating mode and a single bank cut out (SBCO) operating mode. The phrase "low load engine operating condition" refers to an engine operating condition that can be met without firing all of the cylinder banks of the engine 14. For example, the low load engine operating condition can be operating the engine 14 at an idle speed. In another example, the low load engine operating condition can occur when the vehicle is in-mission. Such low load engine operating conditions can include a truck driving downhill, a locomotive operating at a low speed or slowing to approach a station, an excavator idling while waiting for a load, a frac rig or drill idling before powering a pump or a drill, respectively, a genset idling while waiting to load, etc.

In the skip-firing operating mode, engine load can be divided between the first cylinder bank 22 and the second cylinder bank 26 such that a portion of the first cylinder bank 22 and a portion of the second cylinder bank 26 are fired. The portion of the first cylinder bank 22 and the portion of the second cylinder bank 26 that are fired are less than a total amount of cylinders in the first cylinder bank 22 and less than a total amount of cylinders in the second cylinder bank 26, respectively. In a skip-firing mode, the cylinder firing order skips adjacent cylinders such that half of the cylinders of the first cylinder bank 22 and the second cylinder bank 26 fire. For example, for a V16 engine, 8 cylinders fire. In some embodiments, the cylinders that fire are at the ends of the first cylinder bank 22 and the second cylinder bank 26.

In the SBCO operating mode, the engine 14 shuts down the first cylinder bank 22 or the second cylinder bank 26 and generates the demanded load with the remaining operational cylinder bank 22, 26.

Figure 2:
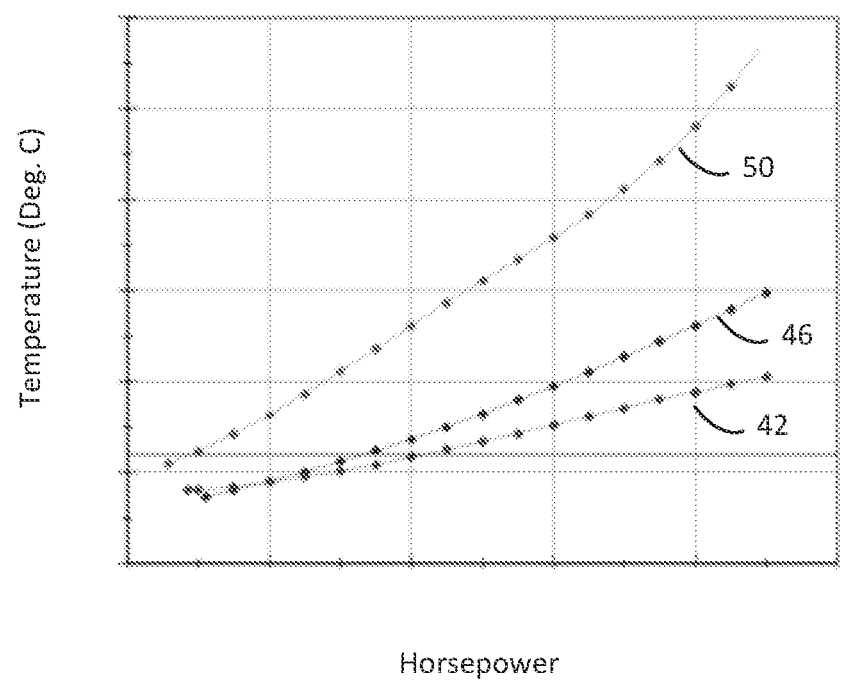
FIG. 2 is a graph illustrating engine exhaust temperatures for various engine firing modes, according to an example embodiment.

FIG. 2 illustrates a plot of exhaust temperature versus horsepower at low ambient temperature and at low engine load operating conditions. Plot 42 illustrates an engine that is firing on all of the cylinders in the first cylinder bank 22 and the second cylinder bank 26. Plot 46 illustrates an engine that is operating according to the skip-firing mode. Plot 50 illustrates an engine that is operating according to the SBCO operating mode. As illustrated in FIG. 2, the temperature of the exhaust generated by the engine operating with all cylinders firing is substantially similar to the temperature of the exhaust generated by the engine operating under the skip-firing operating mode. The temperature of the exhaust generated by the engine operating under the SBCO operating mode is significantly higher than the exhaust generated by firing the engine on all cylinders or firing the engine according to the skip-firing operating mode. Therefore, commanding the engine 14 to fire all cylinders or commanding the engine 14 to operate according to the skip-firing operating mode can be used to generate lower temperature exhaust (e.g., relative to the SBCO operating conditions) to prevent overheating of components of the exhaust aftertreatment system 18, such as DEF dosers 78. Furthermore, both of the cylinder banks 22, 26 are firing, so the engine 14 and the exhaust aftertreatment systems 18 warm up substantially evenly. Under low load engine operating conditions, the engine 14 is operated according to the skip-firing mode to prevent overheating of the components of the exhaust aftertreatment system 18 to reduce fuel consumption (e.g., relative to firing all of the cylinders).

Returning to FIG. 1, the vehicle includes an exhaust aftertreatment system 18 in exhaust-gas receiving communication with each of the first cylinder bank 22 and the second cylinder bank 26. For the sake of convenience, the same numbering is used for both of the exhaust aftertreatment systems 18 and the components therein. Each of the exhaust aftertreatment systems 18 includes a diesel particulate filter (DPF) 54, a diesel oxidation catalyst (DOC) 58, a selective catalytic reduction (SCR) system 62 with an SCR catalyst 66, and an ammonia oxidation (AMOx) catalyst 70. The SCR system 62 further includes a reductant delivery system that has a diesel exhaust fluid (DEF) source 74 that supplies DEF to a DEF doser 78 via a DEF line 82. The DEF in the DEF source 74 and/or in the DEF line 82 can freeze during low ambient temperature conditions and can prevent the DEF dosers 78 from dispensing DEF until the DEF in the DEF source 74 and/or the DEF lines 82 have thawed.

Combustion air enters the engine 14 through an engine intake manifold 34 and flows to the first and second combustion cylinder banks 22, 26. In an exhaust flow direction, as indicated by directional arrow 84, exhaust gas flows from the engine 14 into inlet piping 86 of the exhaust aftertreatment system 18. From the inlet piping 86, the exhaust gas flows into the DOC 58 and exits the DOC 58 into a first section of exhaust piping 90A. From the first section of exhaust piping 90A, the exhaust gas flows into the DPF 54 and exits the DPF 54 into a second section of exhaust piping 90B. From the second section of exhaust piping 90B, the exhaust gas flows into the SCR catalyst 66 and exits the SCR catalyst 66 into the third section of exhaust piping 90C. As the exhaust gas flows through the second section of exhaust piping 90B, it is periodically dosed with DEF by the DEF doser 78. Accordingly, the second section of exhaust piping 90B acts as a decomposition chamber or tube to facilitate the decomposition of the DEF to ammonia. From the third section of exhaust piping 90C, the exhaust gas flows into the AMOx catalyst 70 and exits the AMOx catalyst 70 into the outlet piping 94 before the exhaust gas is expelled from the exhaust aftertreatment system 18. Based on the foregoing, in the illustrated embodiment, the DOC 58 is positioned upstream of the DPF 54 and the SCR catalyst 66, and the SCR catalyst 66 is positioned downstream of the DPF 54 and upstream of the AMOx catalyst 70. However, in alternative embodiments, other arrangements of the components of the exhaust aftertreatment system 18 are also possible (e.g., the AMOx catalyst 70 may be excluded from the exhaust aftertreatment system 18).

The DOC 58 may have any of various flow-through designs. Generally, the DOC 58 is structured to oxidize at least some particulate matter, e.g., the soluble organic fraction of soot, in the exhaust and reduce unburned hydrocarbons and CO in the exhaust to less environmentally harmful compounds. For example, the DOC 58 may be structured to reduce the hydrocarbon and CO concentrations in the exhaust to meet the requisite emissions standards for those components of the exhaust gas. An indirect consequence of the oxidation capabilities of the DOC 58 is the ability of the DOC 58 to oxidize NO into $NO_2$. In this manner, the level of $NO_2$ exiting the DOC 58 is equal to the $NO_2$ in the exhaust gas generated by the engine 14 plus the $NO_2$ converted from NO by the DOC 58.

In addition to treating the hydrocarbon and CO concentrations in the exhaust gas, the DOC 58 may also be used in the controlled regeneration of the DPF 54, the SCR catalyst 66, and the AMOx catalyst 70. This can be accomplished through the injection, or dosing, of unburned HC into the exhaust gas upstream of the DOC 58. Upon contact with the DOC 58, the unburned HC undergoes an exothermic oxidation reaction which leads to an increase in the temperature of the exhaust gas exiting the DOC 58 and subsequently entering the DPF 54, the SCR catalyst 66, and/or the AMOx catalyst 70. The amount of unburned HC added to the exhaust gas is selected to achieve the desired temperature increase or target controlled regeneration temperature.

The DPF 54 may be any of various flow-through designs, and is structured to reduce particulate matter concentrations, e.g., soot and ash, in the exhaust gas to meet one or more requisite emission standards. The DPF 54 captures particulate matter and other constituents, and thus needs to be periodically regenerated to burn off the captured constituents. Additionally, the DPF 54 may be configured to oxidize NO to form $NO_2$ independent of the DOC 58.

As discussed above and in this example configuration, the SCR system 62 includes a reductant delivery system with the DEF source 74, pump (not shown) and or doser 78. The reductant source 74 can be a container or tank capable of retaining a reductant, such as, for example, ammonia ($NH_3$), DEF (e.g., urea), or diesel oil. The reductant source 74 is in reductant supplying communication with the pump, which is configured to pump reductant from the reductant source 74 to the DEF doser 78 via a reductant delivery line. The DEF doser 78 is positioned upstream of the SCR catalyst 66. The controller 38 is structured to control the timing and amount of the DEF delivered to the exhaust gas. While the disclosure generally refers to the reductant DEF, in some embodiments ammonia can be dispensed from the DEF dosers 78 instead of or in addition to DEF. DEF decomposes to produce ammonia. As briefly described above, the ammonia reacts with NOx in the presence of the SCR catalyst 66 to reduce the NOx to less harmful emissions, such as $N_2$ and $H_2O$. The NOx in the exhaust gas stream includes $NO_2$ and NO. Generally, both $NO_2$ and NO are reduced to Na and $H_2O$ through various chemical reactions driven by the catalytic elements of the SCR catalyst 66 in the presence of $NH_3$.

The SCR catalyst 66 may be any of various catalysts known in the art. For example, in some embodiments, the SCR catalyst 66 is a vanadium-based catalyst, and in other embodiments, the SCR catalyst 66 is a zeolite-based catalyst, such as a Cu-Zeolite or a Fe-Zeolite catalyst. In one representative embodiment, the reductant is aqueous urea and the SCR catalyst 66 is a zeolite-based catalyst. In some embodiments, an efficiency of the SCR catalyst 66 is temperature dependent, meaning that the SCR catalyst 66 is more efficient at reducing the NOx into less-harmful emissions at higher temperatures.

The AMOx catalyst 70 may be any of various flow-through catalysts structured to react with ammonia to produce mainly nitrogen. As briefly described above, the AMOx catalyst 70 is structured to remove ammonia that has slipped through or exited the SCR catalyst 66 without reacting with NOx in the exhaust. In certain instances, the exhaust aftertreatment system 18 can be operable with or without an AMOx catalyst. Further, although the AMOx catalyst 70 is shown as a separate unit from the SCR catalyst 66 in FIGS. 1 and 3, in some implementations, the AMOx catalyst 70 may be integrated with the SCR catalyst 66, e.g., the AMOx catalyst 70 and the SCR catalyst 66 can be located within the same housing. According to the present disclosure, the SCR catalyst 66 and AMOx catalyst 70 are positioned serially, with the SCR catalyst 66 preceding the AMOx catalyst 70.

Various sensors may be strategically disposed throughout the engine 14, the exhaust aftertreatment system 18, and in or proximate the external environment and may be in communication with the controller 38 to monitor operating conditions of the engine system 10 and monitor environmental conditions. For example, the sensors can include NOx sensors 98 and temperature sensors 102 positioned within the exhaust aftertreatment system 18, an engine intake manifold temperature sensor 106, an engine coolant temperature sensor 110, an ambient (e.g., outdoor) temperature sensor 114, and a DEF source 74 temperature sensor 118. In this regard, the controller 38 may receive data from the one or more sensors. The temperature sensors 102 are associated with the SCR catalyst 66 and thus can be defined as SCR temperature sensors 102. The SCR temperature sensors 102 are strategically positioned to detect the temperature of exhaust gas flowing into and out of the SCR catalyst 66. The engine intake manifold temperature sensor 106 can be positioned at or proximate the engine intake manifold 34 of the engine system 10 to detect a temperature of air entering the engine system 10. The engine coolant temperature sensor 110 can be strategically positioned to determine a temperature of the engine coolant. In some embodiments, the ambient temperature sensor 114 can be positioned at or proximate an exterior of the vehicle to determine a temperature of the environment of the vehicle. In other embodiments, the ambient temperature sensor 114 can be at a remote location and in wireless communication with the controller 38 of the vehicle. In some embodiments, the vehicle may not include the ambient air temperature sensor 114. In such embodiments, the controller 38 can determine the ambient air temperature based on the temperature of air entering the engine intake manifold sensed by the sensor 106. The DEF source temperature sensor 118 can be positioned in or proximate the DEF source 74 for determining a temperature of the DEF within the DEF source 74.

Although the exhaust aftertreatment system 18 shown includes one of an DOC 58, DPF 54, SCR catalyst 66, and AMOx catalyst 70 positioned in specific locations relative to each other along the exhaust flow path, in other embodiments, the exhaust aftertreatment system 18 may include more than one of any of the various catalysts positioned in any of various positions relative to each other along the exhaust flow path as desired. Further, although the DOC 58 and AMOx catalyst 70 are non-selective catalysts, in some embodiments, the DOC 58 and AMOx catalyst 70 can be selective catalysts.

FIG. 1 is also shown to include an operator input/output (I/O) device 122. The operator I/O device 122 is communicably coupled to the controller 38, such that information may be exchanged between the controller 38 and the operator I/O device 122, wherein the information may relate to one or more components of FIG. 1 or determinations/commands/instructions/etc. (described below) of the controller 38. The operator I/O device 122 enables an operator of the vehicle (or another passenger) to communicate with the controller 38 and one more components of the vehicle and components of FIG. 1. For example, the operator I/O device 122 may include, but is not limited to, an interactive display, a touchscreen device, one or more buttons and switches, voice command receivers, etc. Via the operator I/O device 122, the controller 38 may provide various information concerning the operations described herein.

Figure 3:
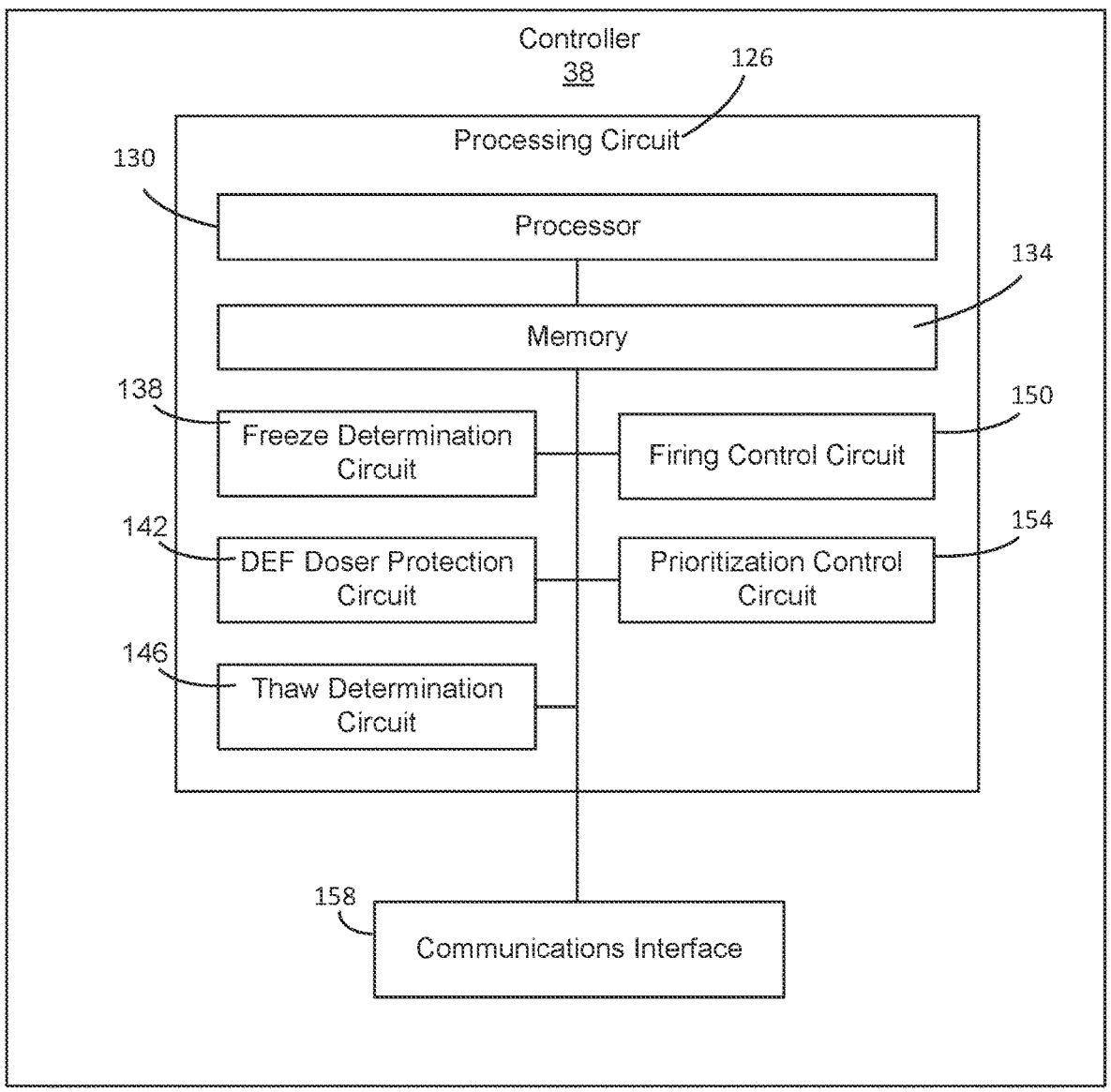
FIG. 3 is a schematic representation of a controller of the vehicle including the engine and the exhaust aftertreatment system of FIG. 1, according to an example embodiment.

The controller 38 is structured to control the operation of the engine system 10 and associated sub-systems, such as the internal combustion engine 14 and the exhaust aftertreatment system 18. According to one embodiment, the components of FIGS. 1 and 3 are embodied in a vehicle. The vehicle may include an on-road or an off-road vehicle including, but not limited to, line-haul trucks, mid-range trucks (e.g., pick-up trucks), tanks, airplanes, locomotives, and any other type of vehicle that utilizes an SCR system. In another embodiment, the engine can be embodied in a generator. Communication between and among the components may be via any number of wired or wireless connections. For example, a wired connection may include a serial cable, a fiber optic cable, a CATS cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 38 is communicably coupled to the systems and components of FIG. 1, the controller 38 is structured to receive data from one or more of the components shown in FIG. 1. For example, the data may include NOx data (e.g., an incoming NOx amount from NOx sensor 98 and an outgoing NOx amount from NOx sensor 98'), temperature data (e.g., the temperatures sensed by the SCR temperature sensor 102, the engine intake manifold temperature sensor 106, the engine coolant temperature sensor 110, the ambient air temperature sensor 114, the DEF source temperature sensor 118), and a vehicle operating data (e.g., engine speed, vehicle speed, engine temperature, etc.) received via one or more sensors. As another example, the data may include an input from operator I/O device 122, such as a demanded engine load. The structure and function of the controller 38 is further described in regard to FIG. 3.

Referring now to FIG. 3, a schematic diagram of the controller 38 of the vehicle of FIG. 1 is shown according to an example embodiment. As shown in FIG. 3, the controller 38 includes a processing circuit 126 having a processor 130 and a memory device 134, a freeze determination circuit 138, a DEF doser protection circuit 142, a thaw determination circuit 146, a firing control circuit 150, a prioritization circuit 154, and the communications interface 158. Generally, the controller 38 is structured to determine a likelihood that at least one of the DEF doser(s) is frozen and, in response to determining that at least one of the DEF dosers(s) is likely frozen, determine a thaw time period, and operate the engine 14 according to a skip-firing mode during the thaw time period.

In one configuration, the freeze determination circuit 138, the DEF doser protection circuit 142, the thaw determination circuit 146, the firing control circuit 150, and the prioritization circuit 154, are embodied as machine or computer-readable media that is executable by a processor, such as the processor 130. As described herein and amongst other uses, the machine-readable media facilitates performance of certain operations to enable reception and transmission of data. For example, the machine-readable media may provide an instruction (e.g., command, etc.) to, e.g., acquire data from a particular sensor or a virtual sensor. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the freeze determination circuit 138, the DEF doser protection circuit 142, the thaw determination circuit 146, the firing control circuit, and the prioritization circuit 154 are embodied as hardware units, such as electronic control units. As such, the freeze determination circuit 138, the DEF doser protection circuit 142, the thaw determination circuit 146, the firing control circuit 150, and the prioritization circuit 154 may be embodied as one or more circuitry components including, but not limited to, processing circuitry, network interfaces, peripheral devices, input devices, output devices, sensors, etc. In some embodiments, the freeze determination circuit 138, the DEF doser protection circuit 142, the thaw determination circuit 146, the firing control circuit 150, and the prioritization circuit 154 may take the form of one or more of analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the freeze determination circuit 138, the DEF doser protection circuit 142, the thaw determination circuit 146, the firing control circuit 150, and the prioritization circuit 154 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The freeze determination circuit 138, the DEF doser protection circuit 142, the thaw determination circuit 146, the firing control circuit 150 and the prioritization circuit 154 may also include programmable hardware devices such as field programmable gate arrays, programmable array logic, programmable logic devices or the like. The freeze determination circuit 138, the DEF doser protection circuit 142, the thaw determination circuit 146, the firing control circuit 150, and the prioritization circuit 154 may include one or more memory devices for storing instructions that are executable by the processor(s) of the freeze determination circuit 138, the DEF doser protection circuit 142, the thaw determination circuit 146, the firing control circuit 150, and the prioritization circuit 154. The one or more memory devices and processor(s) may have the same definition as provided herein with respect to the memory device 134 and the processor 130. In some hardware unit configurations, the freeze determination circuit 138, the DEF doser protection circuit 142, the thaw determination circuit 146, the firing control circuit 150, and the prioritization circuit 154 may be geographically dispersed throughout separate locations in the vehicle. Alternatively, and as shown, the freeze determination circuit 138, the DEF doser protection circuit 142, the thaw determination circuit 146, the firing control circuit 150, and the prioritization circuit 154 may be embodied in or within a single unit/housing, which is shown as the controller 38.

In the example shown, the controller 38 includes a processing circuit 126 having the processor 130 and the memory device 134. The processing circuit 126 may be structured or configured to execute or implement the instructions, commands, and/or control processes described herein with respect to the freeze determination circuit 138, the DEF doser protection circuit 142, the thaw determination circuit 146, the firing control circuit 150, and the prioritization circuit 154. Thus, the depicted configuration represents the freeze determination circuit 138, the DEF doser protection circuit 142, the thaw determination circuit 146, the firing control circuit 150, and the prioritization circuit 154 as machine or computer-readable media. However, as mentioned above, this illustration is not meant to be limiting as the present disclosure contemplates other embodiments where the freeze determination circuit 138, the DEF doser protection circuit 142, the thaw determination circuit 146, the firing control circuit 150, and the prioritization circuit 154 or at least one circuit of the freeze determination circuit 138, the DEF doser protection circuit 142, the thaw determination circuit 146, the firing control circuit 150, and the prioritization circuit 154 is configured as a hardware unit. All such combinations and variations are intended to fall within the scope of the present disclosure.

The processor 130 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the freeze determination circuit 138, the DEF doser protection circuit 142, the thaw determination circuit 146, the firing control circuit 150, and the prioritization circuit 154 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 134 (e.g., RAM, ROM, Flash Memory, hard disk storage, etc.) may store data and/or computer code for facilitating the various processes described herein. The memory device 134 may be communicably connected to the processor 130 to provide computer code or instructions to the processor 130 for executing at least some of the processes described herein. Moreover, the memory device 134 may be or include tangible, non-transient volatile memory or non-volatile memory. Accordingly, the memory device 134 may include database components, object code components, script components, or any other type of information structure for supporting the various activities and information structures described herein.

The communications interface 158 may be/include any combination wired or wireless interfaces (e.g., jacks, antennas, transmitters, receivers, transceivers, wire terminals, etc.) for conducting data communications with various systems, devices, or networks. For example, the communications interface 158 may include an Ethernet card and port for sending and receiving data via an Ethernet-based communications network and/or a Wi-Fi transceiver for communicating via a wireless communications network. The communications interface 158 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 158 of the controller 38 may facilitate communication between and among the controller 38 and one or more components of the vehicle (e.g., components of vehicle subsystems (such as the engine system 10 and exhaust aftertreatment system 18), the operator I/O device 122, the sensors, etc.). Communication between and among the controller 38 and the components of the vehicle may be via any number of wired or wireless connections (e.g., any standard under IEEE 742, etc.). For example, a wired connection may include a serial cable, a fiber optic cable, a CATS cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The freeze determination circuit 138 is structured to activate in response to determining that the engine 14 has just been started. The freeze determination circuit 138 is structured to receive information indicative of an ambient air temperature from the ambient air temperature sensor 114 and to receive information indicative of a temperature of the DEF stored in the DEF source 74 from the DEF source temperature sensor 118. The freeze determination circuit 138 is structured to determine a likelihood that at least one of the DEF dosers 78 is frozen based on the information indicative the of ambient air temperature and/or the information indicative of the DEF source 74 temperature. For example, the freeze determination circuit 138 can be structured to compare the information indicative of the ambient air temperature to a predetermined ambient air temperature threshold. The freeze determination circuit 138 can compare the information indicative of the DEF source 74 temperature to a predetermined DEF source temperature threshold. The freeze determination circuit 138 can determine that at least one of the DEF dosers 78 is likely frozen in response to determining that the ambient temperature is below the predetermined air temperature threshold and/or in response to determining that the DEF source 74 temperature is below the predetermined DEF source temperature threshold. The predetermined air temperature threshold and/or the predetermined DEF source temperature threshold can be a temperature freezing point or a range of freezing points for the DEF. The freeze determination circuit 138 is structured to set a DEF frozen flag or fault code in response to determining that at least one of the DEF doser(s) 78 is likely frozen. The freeze determination circuit 138 is structured not to set the DEF frozen flag in response to determining that the DEF dosers 78 are not frozen.

In some embodiments, the freeze determination circuit 138 can be structured to receive information indicating that the DEF in components upstream of the DEF dosers 78 (e.g., the DEF source 74 and/or the DEF line 82) is frozen. The freeze determination circuit 138 can set and can set the DEF frozen flag in response to determining that the DEF in components upstream of the DEF dosers 78 is frozen.

In some embodiments, the freeze determination circuit 138 can be structured to determine the likelihood that at least one of the DEF doser(s) is in a non-dosing state. When the engine is has recently started in low ambient temperature conditions, dosers 78 in the non-dosing state can be blocked by frozen DEF. In such an embodiment, the freeze determination circuit 138 is structured to receive information indicative of a dosing state of at least one of the DEF doser(s) 78. In some embodiments, the information indicative of the dosing state of at least one of the DEF doser(s) 78 can include a pressure at or proximate at least one of the DEF doser(s) 78, a temperature at or proximate at least one of the DEF doser(s) 78, and/or a presence of a blockage at or proximate at least one of the DEF doser(s) 78. The freeze determination circuit 138 can be structured to determine a likelihood that at least one of the DEF doser(s) 78 is in the non-dosing state based on the information indicative of the dosing state of at least one of the DEF doser(s) 78. The freeze determination circuit 138 is structured to set a non-dosing flag in response to determining that at least one of the DEF doser(s) 78 is likely in the non-dosing state. The freeze determination circuit 138 is structured not to set the non-dosing in response to determining that the DEF dosers 78 are likely all in the dosing state.

The DEF doser protection circuit 142 is structured to activate in response to determining that at least one DEF doser 78 is frozen. For example, the DEF doser protection circuit 142 can be structured to activate in response to determining that the DEF frozen flag is present. In some embodiments, the DEF doser protection circuit 142 is structured to activate in response to engine intake manifold 34 temperatures falling below a predetermined threshold and/or engine coolant temperatures falling below a predetermined threshold in addition to the presence of the DEF frozen flag. The DEF doser protection circuit 142 is structured to receive the information indicative of the temperature of the DEF stored in the DEF source 74 and/or the information indicative of the ambient air temperature. The DEF doser protection circuit 142 is structured to determine a thaw time period based on the information indicative of the ambient air temperature and/or the information indicative of the temperature DEF stored in the DEF source 74. The thaw time period can include an amount of time likely required for the at least one DEF doser 78 to thaw and an additional buffer time period to let the reductant delivery system recover from the frozen DEF doser(s) 78. In some embodiments, the additional buffer time period can be based on an amount of time it takes the DEF pump(s) to prime. In some embodiments, the DEF doser protection circuit 142 can determine the thaw time period by using the information indicative of the ambient air temperature and/or the information indicative of the DEF source temperature as inputs into one or more look-up tables. In instances where the thaw time is determined based on the information indicative of the ambient air temperature and the information indicative of the DEF source temperature are different, the DEF doser protection circuit 142 is structured to use the longer thaw time period.

The DEF doser protection circuit 142 is structured to command the firing control circuit 150 to operate the engine 14 according to a skip-fire mode for the thaw time period. After expiration of the thaw time period, the DEF doser protection circuit 142 is structured to receive information indicative of a state of the DEF doser(s) 78. In the illustrated embodiment, the state of the DEF doser(s) 78 can be a frozen state or a thawed state. In some embodiments, the information indicative of the state of the DEF doser(s) 78 can include a temperature of the DEF source 74, a temperature of the exhaust entering the exhaust aftertreatment system 18, and/or and a temperature of the DEF at or proximate one or more of the DEF doser(s) 78. The DEF doser protection circuit 142 can determine that the DEF doser(s) 78 have likely thawed based on the information indicative of the state of the DEF doser(s) 78. The DEF doser protection circuit 142 is structured to discontinue the skip-firing mode. In response to determining that the DEF doser(s) 78 have likely thawed, the DEF doser protection circuit 142 is structured to remove the DEF frozen flag. Removal of the DEF frozen flag can permit the firing control circuit 150 to operate the engine 14 according to the SBCO operating mode in low load engine operating conditions. The DEF doser protection circuit 142 is structured to deactivate after removing the DEF frozen flag. In some embodiments, the controller 38 can set a post-thaw flag in response to detecting failure of pump to prime after removal of the DEF frozen flag.

In response to determining that the DEF doser(s) 78 have not likely thawed, the DEF doser protection circuit 142 is structured to retain the DEF frozen flag. The DEF doser protection circuit 142 is structured to determine a second thaw time period based on the information indicative of the ambient air temperature and/or the information indicative of the temperature of the DEF source 74 as described above. In some embodiments, the DEF doser protection circuit 142 is structured to determine the second time period at least partially based on the information indicative of the state of the DEF doser(s) 78. The information indicative of the state of the DEF doser(s) 78 can therefore be used for feedback control of the operations performed by the DEF doser protection circuit 142.

In some embodiments, the DEF doser protection circuit 142 can determine a likelihood that both the DEF doser(s) 78 and the DEF stored in the DEF source 74 have likely thawed. In such embodiments, the DEF doser protection circuit 142 is structured to remove the DEF frozen flag in response to determining that both the DEF doser(s) 78 and the DEF in the DEF source 74 are thawed.

The firing control circuit 150 is structured to receive information indicative of a desired load on the engine 14 from an operator I/O device 122 such as an acceleration pedal or a lever. The firing control circuit 150 is structured to control the cylinder firing dynamics of the first cylinder bank 22 and the second cylinder bank 26 based on the information indicative of the desired load on the engine 14 and commands and/or feedback from other engine and/or vehicle systems such as the operator I/O device 122. In the illustrated embodiment, the firing control circuit 150 is structured to receive commands from the DEF doser protection circuit 142. More specifically, the firing control circuit 150 is structured to fire the first cylinder bank 22 and the second cylinder bank 26 according to the skip-firing mode for the thaw time period in response to a command from the DEF doser protection circuit 142. The firing control circuit 150 is structured to discontinue the SBCO mode, any load management modes, and any fast idle modes in response to determining that the DEF frozen flag is present. The firing control circuit 150 is structured to discontinue the skip-firing mode in response to determining and/or receiving information indicating that the DEF dosers 78 have thawed. The firing control circuit 150 is structured to fire the first cylinder bank 22 and the second cylinder bank 26 according to the SBCO mode during low engine load operating conditions in response to determining that the DEF frozen flag is absent. Operating the engine 14 according to the SBCO mode during low engine load operating conditions can reduce an amount of hydrocarbons produced by the engine 14, thereby reducing an amount of SCR catalyst 66 regeneration events that occur when the SCR catalyst 66 has high amounts of bound hydrocarbons.

Figure 4:
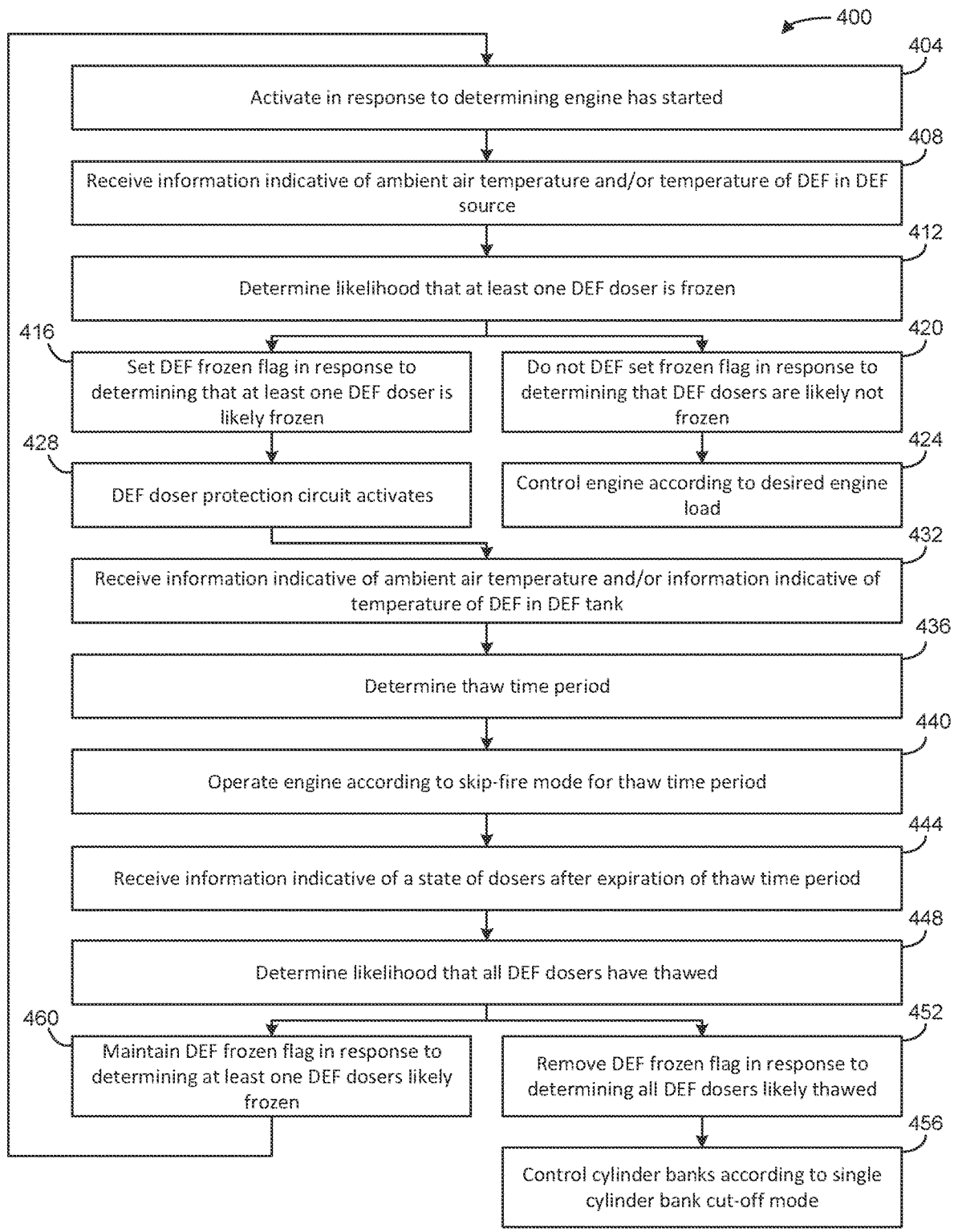
FIG. 4 is a flow diagram of a method for protecting diesel exhaust fluid (DEF) dosers during cold engine starting conditions, according to an example embodiment.

FIG. 4 illustrates an exemplary method 400 for protecting DEF dosers 78 during cold engine 14 starting conditions. At process 404, the freeze determination circuit 138 activates in response to determining that the engine 14 has just started. At process 408, the freeze determination circuit 138 receives information indicative of the ambient air temperature and/or information indicative of the temperature of the DEF stored in the DEF source 74. At process 412, the freeze determination circuit 138 determines the likelihood that at least one of the DEF doser(s) 78 is frozen based on the information indicative of the ambient air temperature and/or the information indicative of the temperature of the DEF stored in the DEF source 74. For example, the freeze determination circuit 138 can compare the information indicative of the ambient air temperature to a predetermined ambient air temperature threshold. The freeze determination circuit 138 can compare the information indicative of the DEF source 74 temperature to a predetermined DEF source temperature threshold. The freeze determination circuit 138 can determine that at least one of the DEF dosers 78 is likely frozen in response to determining that the ambient temperature is below the predetermined air temperature threshold and/or in response to determining that the DEF source 74 temperature is below the predetermined DEF source temperature threshold. At process 416, the freeze determination circuit 138 sets the DEF frozen flag in response to determining that at least one of the DEF doser(s) 78 is likely frozen. At process 420, the freeze determination circuit 138 does not set the DEF frozen flag in response to determining that it is unlikely that any of the DEF doser(s) 78 are likely frozen. At process 424, the firing control circuit 150 controls the engine 14 according to the desired engine load input by the operator using the operator I/O device 122.

At process 428, the DEF doser protection circuit 142 activates in response to determining that the DEF frozen flag is present. At process 432, the DEF doser protection circuit 142 receives the information indicative of the ambient air temperature and/or the information indicative of the temperature of the DEF stored in the DEF source 74. At process 436, the DEF doser protection circuit 142 determines the thaw time period based on the information indicative of the ambient air temperature and/or the information indicative of the temperature of the DEF stored in the DEF source 74. In some embodiments, the DEF doser protection circuit 142 determines the thaw time period by inputting the information indicative of the ambient air temperature and/or the information indicative of the DEF source temperature into one or more look-up tables. The DEF doser protection circuit 142 chooses the longer thaw time in instances in which the thaw time is determined based on the information indicative of the ambient air temperature and the information indicative of the DEF source temperature are different.

At process 440, the DEF doser protection circuit 142 is structured to command the firing control circuit to operate the engine 14 according to a skip-fire mode for the thaw time period. During the skip-fire mode, the portion of the first cylinder bank 22 and the portion of the second cylinder bank 26 that are fired are less than a total amount of cylinders in the first cylinder bank 22 and less than a total amount of cylinders in the second cylinder bank, respectively. During the skip-firing mode, each of the first cylinder bank 22 and the second cylinder bank 26 produce exhaust having a temperature that is cooler than a single bank operating according to a SBCO operating mode. The temperature of the exhaust produced during the skip-firing mode is hot enough to thaw frozen DEF doser(s) 78 while reducing a likelihood that frozen DEF doser(s) 78 overheat.

At process 444, after expiration of the thaw time period, the DEF doser protection circuit 142 is structured to receive information indicative of a state of the DEF doser(s) 78. At process 448, the DEF doser protection circuit 142 is structured to determine a likelihood that all of the DEF doser(s) 78 have thawed based on the information indicative of the state of the DEF doser(s) 78. In some embodiments, the information indicative of the state of the DEF doser(s) 78 can include a temperature of the DEF source 74, a temperature of the exhaust entering the exhaust aftertreatment system 18, and/or a temperature of the DEF at or proximate one or more of the DEF doser(s) 78. At process 452, in response to determining that the DEF doser(s) 78 are likely thawed, the DEF doser protection circuit 142 removes the DEF frozen flag. In response to determining that the DEF doser(s) 78 are likely thawed, the DEF doser protection circuit 142 discontinues the skip-firing mode. At process 456, in response to the removal of the DEF frozen flag, the DEF doser protection circuit 142 deactivates and the firing control circuit 150 controls the first cylinder bank 22 and the second cylinder bank 26 according to the SBCO mode.

At process 460, in response to determining that one or more of the DEF doser(s) 78 is likely frozen, the DEF doser protection circuit 142 maintains the DEF frozen flag. The DEF doser protection circuit 142 then returns to process 432. In some embodiments, when the DEF doser protection circuit 142 repeats process 434, the DEF doser protection circuit 142 can also receive information indicative of a temperature of one or more DEF doser(s) 78.

The prioritization circuit 154 is structured to activate in response to low load engine operating conditions in low ambient temperature operating conditions. In some embodiments, the low load engine operating conditions in low temperature operating conditions occur when the engine 14 has recently started. The prioritization circuit 154 is structured to determine whether to operate the engine 14 to protect the plurality of DEF dosers 78 and or to protect the SCR catalyst 66. For example, operating the engine 14 according to the skip-firing mode produces cooler exhaust with both the first cylinder bank 22 and the second cylinder bank 26, which is warm enough to thaw frozen DEF doser(s) 78 but cool enough to prevent the frozen DEF doser(s) 78 from overheating. However, the SCR catalyst 66 can be more efficient at higher operating temperatures, meaning that the cooler exhaust produced in the skip-firing mode can reduce SCR catalyst 66 efficiency and/or cause accumulation of DEF on the SCR catalyst 66. Operating the engine 14 according to the SBCO firing mode produces high temperature exhaust with one of the first cylinder bank 22 and the second cylinder bank 26. The high temperature exhaust produced during the SBCO mode can result in overheating of frozen DEF doser(s) 78. The SCR catalyst 66 is more efficient at higher exhaust temperatures. The SCR catalyst 66 can also undergo regeneration when the engine 14 is operated to produce high temperature exhaust. Therefore, in conditions where the SCR catalyst 66 has high levels of hydrocarbon loading, operating the engine 14 according to the SBCO mode can protect the SCR catalyst 66 by allowing at least a portion of the hydrocarbons on the SCR catalyst 66 to burn off. The prioritization circuit 154 is structured to prioritize, in order of highest priority to lowest priority, SCR desorption (e.g., SCR catalyst 66 regeneration) in response to determining very high levels of bound hydrocarbons are likely present, protecting DEF dosers 78 that are likely frozen (e.g., as indicated by the DEF frozen flag), SCR desorption in response to determining high levels of bound hydrocarbon are likely present (e.g., SCR catalyst 66 regeneration), and normal SBCO operation (e.g., without any SCR catalyst regeneration 66).

Figure 5:
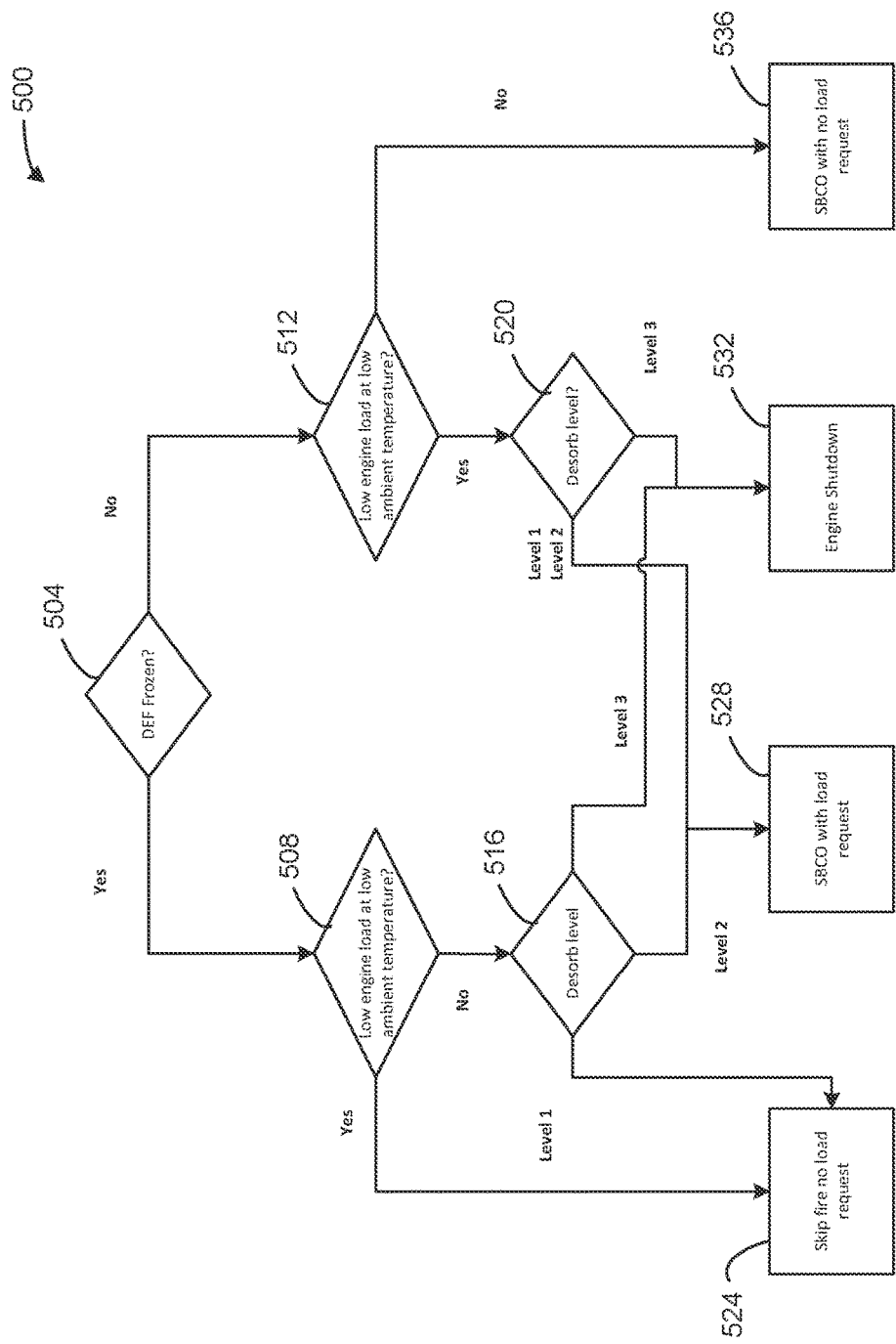
FIG. 5 is a flow diagram of a logic structure for prioritizing the selection of engine firing conditions based on a likelihood that any of the DEF doser(s) is frozen and based on a hydrocarbon loading of a selective catalytic reduction (SCR) catalyst, according to an example embodiment.

A control logic diagram 500 of the prioritization circuit 154 is generally shown in FIG. 5. The prioritization circuit 154 is structured to determine whether at least one of the DEF doser(s) 78 is likely frozen at process 504. For example, the prioritization circuit 154 can be structured to query the thaw determination circuit 146 to determine a presence or an absence of the DEF frozen flag. When the engine 14 has recently started in cold ambient temperature conditions, DEF doser(s) 78 can be blocked by frozen DEF. The prioritization circuit 154 is structured to determine whether the vehicle is operating with a low operating load under low temperature operating conditions at process 508 (when at least one DEF doser 78 is likely frozen) or process 512 (after determining the DEF dosers 78 are likely not frozen) based on information indicative of a desired load on the engine 14 from an operator I/O device 122 such as an acceleration pedal or a lever and information indicative of an ambient temperature determined by one or more of the temperature sensors 106, 110, 114, 118.

The prioritization circuit 154 is structured to determine a hydrocarbon loading of the SCR catalyst 66 at processes 516 or 520. For example, the prioritization circuit 154 can determine whether the SCR catalyst 66 has low-to-intermediate hydrocarbon loading (e.g., hydrocarbon loading below a predetermined level 1 threshold) and/or whether the SCR catalyst 66 has very high hydrocarbon loading (e.g., hydrocarbon loading above a predetermined level 3 threshold) and/or whether the SCR catalyst 66 has high hydrocarbon loading (e.g., at a predetermined level 2 threshold, which is loading above the predetermined level 1 threshold and below the predetermined level 3 threshold).

The prioritization circuit 154 is structured to prioritize the selection of engine firing conditions based on a likelihood that any of the DEF doser(s) 78 is frozen and based on a hydrocarbon loading of the SCR catalyst 66. The prioritization circuit 154 is structured to operate the engine 14 according to the skip-firing mode 524 in response to determining that the DEF frozen flag is present and/or that at least one of the DEF doser(s) 78 is likely frozen, and the engine 14 has a low operating load under low temperature operating conditions. For example, the prioritization circuit 154 can be structured to operate the engine 14 according to the method 400. The prioritization circuit 154 is structured to operate the engine 14 according to the skip-firing mode 524 in response to determining that the DEF frozen flag is present, the engine 14 is not operating with a low operating load under low temperature operating conditions, and the SCR catalyst 66 has low-to-intermediate loading.

The prioritization circuit 154 is structured to prioritize (e.g., choose engine 14 operating conditions that are beneficial for) SCR catalyst 66 health over preventing overheating of frozen DEF doser(s) 78 when the SCR catalyst 66 has high or very high hydrocarbon loading. The prioritization circuit 154 is structured to operate the engine 14 according to the SBCO firing mode 528 in response to determining that the DEF frozen flag is present, the engine 14 is not operating with a low operating load under low temperature operating conditions, and the SCR catalyst 66 has high hydrocarbon loading. The prioritization circuit 154 is structured to shut the engine 14 down in response to determining that the DEF frozen flag is present, the engine 14 is not operating with a low operating load under low temperature operating conditions, and the SCR catalyst 66 has very high hydrocarbon loading.

The prioritization circuit 154 is structured to control the engine 14 based on the loading of the SCR catalyst 66 in response to determining that the DEF frozen flag is absent. The prioritization circuit 154 is structured to operate the engine 14 according to the SBCO firing mode 528 in response to determining that the DEF frozen flag is not present and the engine 14 is not operating with a low operating load under low temperature operating conditions. The prioritization circuit 154 is structured to operate the engine 14 according to the SBCO firing mode 528 in response to determining that the DEF frozen flag is not present, the engine 14 is operating at a low operating load under low temperature operating conditions, and the SCR catalyst 66 has low or high loading. The prioritization circuit 154 is structured to shut the engine 14 down at process 532 in response to determining that the DEF frozen flag is not present, and the engine 14 is operating at a low operating load under low temperature operating conditions, and the SCR catalyst 66 has very high hydrocarbon loading.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional high members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 3, it should be understood that the controller 118 may include any number of circuits for completing the functions described herein. For example, the activities and functionalities of the circuits 138-154 may be combined in multiple circuits or as a single circuit. Additional circuits with additional functionality may also be included. Further, the controller 118 may further control other activity beyond the scope of the present disclosure.

As mentioned above and in one configuration, the "circuits" may be implemented in machine-readable medium for execution by various types of processors, such as the processor 130 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
determining that at least one diesel emissions fluid (DEF) doser of an exhaust aftertreatment system is frozen based on at least one of an ambient air temperature and a DEF source temperature, the exhaust aftertreatment system in exhaust gas receiving communication with an engine operating according to a low load condition and that includes a plurality of cylinders;
operating the engine in a skip-fire mode in response to the determination that the at least one DEF doser is frozen, the skip-fire mode comprising firing a portion of the plurality of cylinders, the portion of the plurality of cylinders being less than a total amount of cylinders of the plurality of cylinders; and
discontinuing the skip-fire mode in response to determining that the at least one DEF doser is likely thawed.

2. The method of claim 1, further comprising determining a period of time in which the skip-fire mode is likely to thaw the at least one DEF doser based on the ambient air temperature and discontinuing the skip-fire mode at the end of the period of time.

3. The method of claim 1, wherein the plurality of cylinders form a first cylinder bank and a second cylinder bank, and wherein discontinuing the skip-fire mode comprises firing one of the first cylinder bank and the second cylinder bank and not firing the other of the first cylinder bank and the second cylinder bank.

4. The method of claim 1, wherein the skip-fire mode further comprises controlling the engine to reduce a temperature of the exhaust gas such that the exhaust gas can thaw the at least one DEF doser without causing the at least one DEF doser to overheat.

5. The method of claim 1, further comprising:
determining a hydrocarbon loading of a selective catalytic reduction (SCR) catalyst of the exhaust aftertreatment system;
comparing the hydrocarbon loading of the SCR catalyst to a predefined threshold indicative of high hydrocarbon loading of the SCR catalyst; and
responsive to determining that the hydrocarbon loading of the SCR catalyst is at or above the predefined threshold, discontinuing the skip-fire mode.

6. The method of claim 5, wherein discontinuing the skip-fire mode includes shutting down the engine.

7. The method of claim 1, further comprising:
determining a hydrocarbon loading of a selective catalytic reduction (SCR) catalyst of the exhaust aftertreatment system;
comparing the hydrocarbon loading of the SCR catalyst to a predefined threshold indicative of low-to-intermediate hydrocarbon loading of the SCR catalyst; and
responsive to determining that the hydrocarbon loading of the SCR catalyst is at or above the predefined threshold, operating the engine in the skip-fire mode in response to the determination that the at least one DEF doser is frozen.

8. An apparatus comprising:
a freeze determination circuit structured to determine that at least one diesel emissions fluid (DEF) doser of an exhaust aftertreatment system is frozen based on at least one of an ambient air temperature and a DEF source temperature, the exhaust aftertreatment system in exhaust gas receiving communication with an engine including a plurality of cylinders and structured to operate according to a low load condition; and
a DEF doser protection circuit structured to:
operate the engine in a skip-fire mode in response to the determination that the at least one DEF doser is frozen, the skip-fire mode comprising firing a portion of the plurality of cylinders, the portion of the plurality of cylinders being less than a total amount of cylinders of the plurality of cylinders;

determine that the at least one DEF doser is likely thawed; and discontinue the skip-fire mode in response to determining that the at least one DEF doser is likely thawed.

9. The apparatus of claim 8, wherein the DEF doser protection circuit is structured to determine a period of time in which the skip-fire mode is likely to thaw the at least one DEF doser based on the ambient air temperature and is structured to discontinue the skip-fire mode at the end of the period of time.

10. The apparatus of claim 8, wherein the plurality of cylinders form a first cylinder bank and a second cylinder bank, and wherein discontinuing the skip-fire mode comprises firing the first cylinder bank and the second cylinder bank and not firing the other of the first cylinder bank and the second cylinder bank.

11. The apparatus of claim 8, wherein the skip-fire mode is structured to control the engine to reduce a temperature of the exhaust gas such that the exhaust gas can thaw the at least one DEF doser without causing the at least one DEF doser to overheat.

12. The apparatus of claim 8, further comprising a prioritization circuit structured to:
determine a hydrocarbon loading of a selective catalytic reduction (SCR) catalyst of the exhaust aftertreatment system;
compare the hydrocarbon loading of the SCR catalyst to a predefined threshold indicative of high hydrocarbon loading of the SCR catalyst; and
responsive to determining that the hydrocarbon loading of the SCR catalyst is at or above the predefined threshold, discontinue the skip-fire mode.

13. The apparatus of claim 12, wherein discontinuing the skip-fire mode includes shutting down the engine.

14. The apparatus of claim 8, further comprising a prioritization circuit structured to:
determine a hydrocarbon loading of a selective catalytic reduction (SCR) catalyst of the exhaust aftertreatment system;
compare the hydrocarbon loading of the SCR catalyst to a predefined threshold indicative of low-to-intermediate hydrocarbon loading of the SCR catalyst; and
responsive to determining that the hydrocarbon loading of the SCR catalyst is at or above the predefined threshold, operate the engine in the skip-fire mode in response to the determination that the at least one DEF doser is frozen.

15. A system comprising:
an exhaust aftertreatment system in exhaust gas receiving communication with an engine including a plurality of cylinders, wherein the engine is structured to operate according to low load conditions; and
a controller structured to:
determine that at least one diesel emissions fluid (DEF) doser is frozen based on at least one of an ambient air temperature and a DEF source temperature;
operate the engine according to a skip-fire mode in response to a DEF flag indicating that the at least one DEF doser is frozen, the skip-fire mode comprising firing a portion of the plurality of cylinders, the portion of the plurality of cylinders being less than a total amount of cylinders of the plurality of cylinders; and
discontinue the skip-fire mode in response to determining that the at least one DEF doser is likely thawed.

16. The system of claim 15, wherein the controller is structured to:
determine a period of time in which the skip-fire mode is likely to thaw the at least one DEF doser based on the ambient air temperature; and
discontinue the skip-fire mode at the end of the period of time.

17. The system of claim 15, wherein the plurality of cylinders form a first cylinder bank and a second cylinder bank, and wherein discontinuing the skip-fire mode comprises firing the first cylinder bank and the second cylinder bank and not firing the other of the first cylinder bank and the second cylinder bank.

18. The system of claim 15, wherein the skip-fire mode is structured to control the engine to reduce a temperature of the exhaust gas such that the exhaust gas can thaw the at least one DEF doser without causing the at least one DEF doser to overheat.

19. The system of claim 15, wherein the controller is structured to:
determine a hydrocarbon loading of a selective catalytic reduction (SCR) catalyst of the exhaust aftertreatment system;
compare the hydrocarbon loading of the SCR catalyst to a predefined threshold indicative of high hydrocarbon loading of the SCR catalyst; and
responsive to determining that the hydrocarbon loading of the SCR catalyst is at or above the predefined threshold, discontinue the skip-fire mode.

20. The system of claim 15, wherein the controller is structured to:
determine a hydrocarbon loading of a selective catalytic reduction (SCR) catalyst of the exhaust aftertreatment system;
compare the hydrocarbon loading of the SCR catalyst to a predefined threshold indicative of low-to-intermediate hydrocarbon loading of the SCR catalyst; and
responsive to determining that the hydrocarbon loading of the SCR catalyst is at or above the predefined threshold, operate the engine in the skip-fire mode in response to the determination that the at least one DEF doser is frozen.

* * * * *